United States Patent [19]

Lipovac

[11] 4,030,417

[45] June 21, 1977

[54] UNIVERSAL FOUNTAIN SOLUTION FOR LITHOGRAPHIC OFFSET PRINTING

[75] Inventor: Stanislava N. Lipovac, Silver Spring, Md.

[73] Assignee: Westvaco Corporation, Laurel, Md.

[22] Filed: Aug. 11, 1975

[21] Appl. No.: 603,291

[52] U.S. Cl. .............................. 101/451; 101/465; 106/2

[51] Int. Cl.$^2$ ...................... B41M 1/00; C09D 5/20

[58] Field of Search ............... 106/2; 101/451, 461, 101/465

[56] References Cited

UNITED STATES PATENTS

| | | | |
|---|---|---|---|
| 2,393,875 | 1/1946 | VanDusen, Jr. | 101/451 |
| 2,534,650 | 12/1950 | Worthen | 101/461 |
| 2,668,763 | 2/1954 | Rubinstein | 106/2 X |
| 2,800,077 | 7/1957 | Marron | 101/461 X |

OTHER PUBLICATIONS

Webster's Third New International Dictionary Unabridged, p. 2288, G&C Merriam Company, Publisher, Springfield, Mass.

*Primary Examiner*—J. Ziegler

[57] ABSTRACT

A universal fountain solution formulation for lithographic printing is disclosed that is particularly useful in Dahlgren-type plate dampening systems. The fountain solution is prepared from two etch concentrates, the first (solution A) having as its primary ingredients a fatty acid material, a monovalent hydroxide and water, and the second (solution B) having as its primary ingredients gum arabic a monovalent iodide and water. Different amounts of the primary ingredients are mixed together to form the etch concentrates which are subsequently mixed together with water to produce the final fountain solution formulations.

36 Claims, No Drawings

UNIVERSAL FOUNTAIN SOLUTION FOR LITHOGRAPHIC OFFSET PRINTING

BACKGROUND OF INVENTION

Of all the printing processes only lithography requires a plate treating system in conjunction with the inking unit. It is easy to understand the reason for this requirement if one keeps in mind the peculiar nature of the lithographic plate. It is planographic, meaning that the image areas are in the same plane as the non-image areas. The image areas are hydrophobic or non-receptive to water, but they accept greasy ink. Meanwhile, the non-image areas are hydrophilic or water receptive and they resist greasy ink. However, in order to have the lithographic press perform properly, both the image and non-image areas of the planographic plate must be treated continuously so that they will retain their individual properties.

The primary functions of the inking system of a lithographic process are in general, (1) to work the ink by conditioning it from what is essentially a plastic state to that of a semi-liquid state, (2) to deposit a uniformly even, thin, film of ink on the image areas of the plate, and, (3) to pick up from the lithographic press any particles of foreign matter and hold them until the entire mechanism is cleaned. Meanwhile, the primary function of the plate treating system or plate dampening system of a lithographic press is to apply an aqueous base, plate dampening solution or fountain solution, to the non-printing areas of the printing plate just prior to the time that the plate comes into contact with the inking system. Thus, the inking rollers of the inking system contact both the image and non-image areas of the printing plate as do the dampening rollers of the plate dampening system which applies the fountain solution to the plate. However, because of the water receptive/non-water receptive characteristics of the non-image/image areas of the plate, the ideal situation is one where the ink tends to adhere only to the image areas of the plate. Accordingly, the image/non-image areas are differentiated only by their affinity toward water and not by any inherent difference toward ink. And therefore, trouble-free lithographic printing requires a delicate balance of the oleophilic and hydrophilic properties in the plate-ink-water system that is governed by maintaining a proper surface free energy difference during printing between the image and non-image surfaces.

On the other hand, there is yet another variable that must be taken into account before the optimum performance of the lithographic press can be achieved. Namely, the characteristics of the different types of paper that are employed in lithography and the paper related printability problems that can and do occur. It has been estimated that between 5–20% of the water in the fountain solution can be transferred from the plate to the paper during the lithographic printing process, and although the absolute amount of water transferred is small, the interaction of the fountain solution with the paper can influence printability in many ways. For instance, the water carrying ability of paper influences the correct ink-water ratio especially around highlight areas. Also, the water resistance of paper is important in avoiding piling, milking and related problems. And, finally, the water-paper binder interaction on the paper surface may locally change the ink holdout, to produce wet repellency and deficient color trapping problems.

When coated paper is printed on the lithographic press other problems can occur. Regular coated paper is not wetted easily by pure water. Therefore, the surface tension of the fountain solution must be lower than pure water to permit it to penetrate more easily into the porous coating layer. The tendency of the fountain solution to penetrate the coating layer and extract ingredients therefrom is dependent on the water resistance, composition and porosity of the coated surface. High acidity or high surfactant content of the fountain solution increases its solubilization potential. With respect to the coating ingredients that can be dislocated by the fountain solution, part are water insoluble components that can be suspended in the fountain solution to cause piling on the blanket. They may also be deposited directly on the plate to promote physical wear of the plate. On the other hand, part of the extracted material is water soluble and contains components which can promote ink-in-water emulsification by reducing the interfacial tension at the water/ink interface. In addition, the extracted material can absorb directly onto the printing plate to produce scumming if the water receptivity of the non-image areas is reduced, or plate blinding if the ink receptivity of the image areas becomes impaired. Thus it may be seen that the paper itself plays an important and hitherto unstudied role in the successful action of the lithographic process.

Heretofore, fountain solutions have comprised either tap water, distilled water, dilute aqueous solutions of gum arabic, or relatively complex formulations of water and alcohol and/or other organic solvents. Also it has been proposed heretofore to add glycerine and/or other deliquescents and/or humectants to the fountain solution. In some instances, other additives such as collodial silicic acid and phosphonic acid have been used. However, each of the many fountain solutions of the prior art have been formulated for use with a particular type of printing plate and have not been suitable for use as a universal solution.

As examples of some of the prior art fountain solutions, reference may be made to the following U.S. patents which teach the use of fountain solution formulations containing alcohol and substitutes for alcohol:

| | |
|---|---|
| 2,250,516 | W.H. Wood |
| 3,053,178 | P.W. Greubel |
| 3,354,824 | R.C. Griffith et al |
| 3,398,002 | L.E. Bondurant |
| 3,625,715 | S. Nasca |
| 3,679,479 | D.A. Ray et al |
| 3,877,372 | K.W. Leeds |

However, by the present invention, a fountain solution is disclosed which finds application with all types of lithographic printing plates and in all of the known plate dampening systems. Moreover the fountain solution of the present invention finds particularly good application in the Dahlgren dampening system. The Dahlgren dampening system differs from a conventional dampening system primarily by using the inking system itself to carry the fountain solution as well as the ink to the printing plate. In a conventional lithographic dampening system, the fountain solution is applied to the printing plate from a dampening unit that is separate from the inking system. Thus with the Dahlgren system, the critical relationships between the plate-water-ink-paper interactions are more pronounced than with a conventional dampening system. In this respect, the fountain solution of the present invention overcomes inherent problems in the Dahlgren system, provides a pollution free formulation and takes into account paper related printability problems that have not heretofore been investigated.

The fountain solution of the present invention is useful for the printing of C2S, C1S, surface sized, uncoated and newsprint papers on either web fed or sheet fed presses and tends to alleviate such paper related printing problems as wet piling, linting, picking, plate blinding, loss of ink receptivity and ink offsetting with both conventional and Dahlgren dampening systems. These results are achieved with the fountain solution of the present invention by permitting a lower fountain solution feeding rate to the printing nip; by providing a quicker and more uniform ink distribution on the inking rollers; by producing a lower retention of the fountain solution in the ink supply; by providing faster drying of inks which dry by an oxidation mechanism; by producing better blanket release from the paper; and by providing the printing plates with a longer life.

The fountain solution of the present invention is also low in cost and contains components which are generally readily available and in good supply. In this regard, the fountain solutions normally used in the Dahlgren dampening system contain from 15–25% by volume of an alcohol such as isopropanol. However, isopropanol is from time-to-time in short supply, its cost has been rising steadily and it presents a potential threat to the press room environment. To offset the problems attendant to the use of isopropanol in the Dahlgren dampening system, several so-called alcohol substitutes have been proposed. Unfortunately, most of these alcohol substitutes present other problems including excessive foaming, uneven ink distribution on the inking rollers and ink stripping. Of those that tend to perform satisfactorily on the press, a higher fountain solution feeding rate is required and special adjustments of the distribution rollers must be made. On the other hand, the fountain solution of the present invention does not use alcohol in its formulation and it takes into account the various paper surface properties and problems set forth hereinbefore in relation to the fountain solution-paper-ink interaction in the printing nip.

SUMMARY OF INVENTION

It is an object of the present invention to provide a novel and improved fountain solution formulation for use in the fountain of lithographic printing presses. In particular, the fountain solution of the present invention finds particularly advantageous application when used in a Dahlgren plate dampening system.

The fountain solution of the present invention is formulated without acid and without alcohol in such a manner that the pH and surface tension factors are minimized. Accordingly, with the fountain solution of the present invention, a proper surface free energy difference can be maintained between the image and non-image areas of the plate to produce satisfactory prints from all types of planographic printing plates.

The fountain solution is prepared from two etch concentrates. The first concentrate, Solution A, comprises as one of its primary ingredients a fatty acid material. The fatty acid material useful in the present invention comprises a higher fatty acid or long chain fatty acid having at least about 6 carbon atoms in the linear chain. More particularly, the fatty acids which occur in vegetable oils such as tall oil, soya bean oil and linseed oil are useful in the present invention although animal fatty oils, fats and tallows are also well known sources. For instance, fatty acid fractions such as stearic acid, oleic acid, linoleic acid, and conjugated linoleic acid, all of which occur in tall oil, soya bean oil and linseed oil are useful. In addition modified esters of glycerol and fatty acids such as triglycerides modified with fumaric acid or acrylic acid have also been found useful. General formulas for these sources are:

| | |
|---|---|
| Stearic Acid | $CH_3\ (CH_2)_{16}\ COOH$ |
| Oleic Acid | $C_8H_{17}\ CH{=}CH\ (CH_2)_7\ COOH$ |
| Linoleic Acid | $CH_3\ (CH_2)_4\ CH{=}CHCH_2CH{=}CH\ (CH_2)_7\ COOH$ |
| Conjugated Linoleic Acid | $CH_3\ (CH_2)_4\ CH_2CH{=}CHCH{=}CH\ (CH_2)_7\ COOH$ |
| Triglycerides | $CH_2\ (R_1CO_2)\ CH\ (R_2CO_2)\ CH_2\ (R_3CO_2)$ |

Where one of the aliphatic radicals $R_1$, $R_2$, or $R_3$ is substituted for with a mono or dicarboxylic fatty acid. Finally, both sulfated and sulfonated fatty acid materials are also useful. In the sulfation process sulfuric acid is reacted with the fatty acid to produce a —C—O—S— linkage at the double bond whereas sulfonation produces a —C—S— linkage. In each case, the amount of sulfation or sulfonation should be at least about 50%.

The second etch concentrate, Solution B, comprises as one of its primary ingredients a monovalent iodide material. The monovalent iodide is preferably selected from the group consisting of sodium, potassium, and lithium iodide. On the other hand, it is believed that a bivalent iodide could also be used in the fountain solution, but with less efficiency, since there would be a tendency for the divalent cation to interact with the other ingredients of the fountain solution. The monovalent iodide keeps the image area of the plate clean without etching the plate as does phosphoric acid, and to a lesser extent, magnesium nitrate, two well known plate cleaning ingredients.

To formulate Solution A, the fatty acid material is partially or nearly completely neutralized in water with a monovalent hydroxide selected from the group consisting of potassium, sodium, lithium and ammonium hydroxide. The addition of the alkaline material yields a soap of the fatty acid, which has a high solubility in water thus affecting the surface tension of the solution, to produce a favorable ink-fountain solution interaction on the press. In preparing Solution A, the monovalent hydroxide is first dissolved in either tap or distilled water at more than one-half the total volume desired. The fatty acid material is added to the mixture and the solution is diluted further with water up to 100% of the final volume.

The second fountain solution etch concentrate, Solution B, comprises as its primary ingredients a desensitizing gum, such as gum arabic, a monovalent iodide selected from the group consisting of sodium, potassium or lithium iodide, and water. Solution B is prepared by first dissolving the gum arabic in either tap or distilled water and then the monovalent iodide is added with additional water up to 100% of the final volume.

The final fountain solution formulations are prepared by taking relatively small portions of Solutions A and B, and adding them to fairly large quantities of water to make up the total volumes desired. Specifically, the desired portion of Solution A is initially thoroughly mixed in a volume of water close to the total volume desired and then Solution B is mixed in before adding the final amount of water to make up the total volume desired. The types of water used (i.e., tap, distilled, or deionized) will not affect the performance of the fountain solution on the press, but must be taken into consideration when preparing the final fountain solution formulation from etch concentrates A and B. The proportions of Solutions A and B are also varied depending upon the type of dampening system used (i.e., conventional or Dahlgren), the type of press involved (i.e., sheet fed or web fed), and the type of plate and paper used. The lowest concentrations of Solutions A and B are used in conventional dampening systems and range from about 0.1 to 2% by volume of Solution A and from about 0.05 to 2% by volume of Solution B. In a sheet fed press with the Dahlgren dampening system higher concentrations of the Solutions A and B are required because of the long inking train employed in the Dahlgren system and because the inks used in the Dahlgren system are generally quite tacky. Thus for the sheet fed press with the Dahlgren system, the concentration of Solution A ranges from about 0.5 to 3% by volume and for Solution B, from about 0.5 to 4%. With the web fed press and a Dahlgren dampening system, a medium or intermediate concentration of Solutions A and B has been found satisfactory.

The mechanism of the present invention is not completely understood but is believed to be dependent upon the presence of a long chain fatty acid in the fountain solution. Apparently, the fatty acid component serves as a bridge between the water phase of the dampening system and the ink phase of the inking system. Thus it is conceivable that one end of the chain could be linked to the ink phase while the other end of the chain carries the water phase to the plate surface. The monovalent iodide keeps the image area of the plate clean without etching the plate and does not have a tendency to react with the other ingredients of the fountain solution.

DETAILED DESCRIPTION

The present invention is believed to be best described with the aid of the following Examples.

EXAMPLE I

Several different fountain solution formulations were prepared according to the present invention with a commercially available sulfated tall oil fatty acid material identified as PC-60. PC-60 is sold by Westvaco Corporation and is toll processed for Westvaco by, among others, ICI America Incorporated of Charlotte, N.C. The material is preferably produced by reacting a low rosin containing tall oil fatty acid fraction, made by Westvaco Corporation and identified by the designation L-5, with sulfuric acid. The designation L-5 indicates that the fatty acid fraction contains a maximum of 5% rosin acid and from about 90–95% of the fatty acid fractions mentioned hereinbefore as being useful for preparing the fatty acid materials of the present invention. The reaction between the mineral acid (sulfuric acid) and the fatty acid fractions occurs on the double bond of the fatty acid chain to produce a fatty acid material that has been found useful in the present invention. Initially, several different etch concentrates were prepared as Solutions A-1, A-2 etc., and Solutions B-1, B-2 etc., and subsequently, these concentrates were used to prepare the different fountain solutions. The fountain solutions were then tested for their suitability on the printing press by measuring the surface tension of the solutions (γ, dynes/cm.), the pH, and then by making printing trial runs on a Harris offset press. The etch concentrate formulations are shown in the following charts.

| | Solution A | | | |
|---|---|---|---|---|
| Solution | Sulfated Tall oil (PC-60) gr. | Potassium Hydroxide (KOH) gr. | Water Distilled | Total Volume cc. |
| A-1 | 2 | 0.5 | As req'd | 100 |
| A-2 | 1 | 0.25 | " | 100 |
| A-3 | 2 | 1.0 | " | 100 |
| A-5 | 4 | 2.0 | " | 100 |
| A-6 | 4 | 0.5 | " | 100 |
| A-7 | 7 | 0.5 | " | 100 |

PC-60 is preferably about 70% sulfated but as noted hereinbefore, a sulfation level of at least about 50% would be sufficient for the purposes of the present invention.

| | Solution B | | | |
|---|---|---|---|---|
| Solution | Gum Arabic gr. | Potassium Iodide (KI) gr. | Water Distilled | Total Volume cc. |
| B-1 | 10 | 4 | As req'd | 100 |
| B-2 | 5 | 2 | " | 100 |
| B-3 | 5 | 1 | " | 100 |

The surface tension measurements and pH measurements for Example I are shown in Table I.

TABLE I

| Fountain Solution | Solution A % Vol. | Solution B % Vol. | Dilution Water | F.S. Properties γ (dynes/cm) | pH |
|---|---|---|---|---|---|
| | (A-1) | (B-1) | | | |
| F-1 | 0.1 | 0.1 | Dist. | 58 | 5.6 |
| F-2 | 0.5 | 0.5 | Dist. | 53 | 9.9 |
| F-3 | 0.25 | 0.05 | Dist. | 63 | 8.2 |
| F-4 | 0.25 | 0.1 | Dist. | 53 | 8.5 |
| F-5 | 0.15 | 0.05 | Dist. | 53 | 7.9 |
| F-6 | 0.15 | 0.05 | Deionized | 60 | 9.0 |
| F-7 | 0.15 | 0.05 | Tap | 64 | 6.4 |
| F-8 | 0.2 | 0.2 | Tap | 65 | 6.9 |
| | (A-2) | (B-2) | | | |
| F-9 | 0.4 | 0.4 | Tap | 64 | 6.3 |
| F-10 | 0.8 | 0.5 | Tap | 61 | 7.0 |
| F-11 | 1.0 | 0.2 | Tap | 51 | 7.1 |
| F-12 | 0.5 | 0.2 | Tap | 52.5 | 6.5 |
| F-13 | 0.8 | 0.2 | Tap | 59 | 7.3 |
| | (A-2) | (B-2) | | | |
| F-16 | 2 | 1 | Tap | 54 | 6.5 |
| F-17 | 1.5 | 1.5 | Tap | 56 | 6.2 |
| F-18 | 2 | 3 | Tap | 47 | 6.6 |
| | (A-3) | (B-1) | | | |
| F-19 | 1 | 1 | Tap | 47 | 9.8 |
| F-20 | 2 | 1 | Tap | 46 | 10.8 |
| F-21 | 2 | 2 | Tap | 47 | 10.6 |
| F-22 | 3 | 2 | Tap | 45 | 11 |
| | (A-5) | (B-1) | | | |
| F-23 | 0.5 | 0.5 | Tap | 52 | 9.4 |
| F-24 | 0.5 | 1.0 | Tap | 46 | 9.5 |
| F-25 | 0.5 | 2.0 | Tap | 46 | 9.4 |
| F-26 | 0.5 | 4.0 | Tap | 44 | 9.3 |
| F-27 | 1.0 | 1.0 | Tap | 46 | 10.8 |
| | (A-5) | (B-2) | | | |
| F-28 | 1.0 | 1.5 | Tap | 47.5 | 10.5 |
| F-29 | 0.5 | 1.25 | Tap | 54 | 9.4 |
| | (A-6) | (B-1) | | | |
| F-30 | 1 | 1 | Tap | 48 | 6.6 |
| F-31 | 0.5 | 1 | Tap | 48 | 6.4 |
| F-32 | 0.5 | 0.5 | Tap | 48 | 6.4 |
| F-33 | 0.5 | 0.2 | Tap | 50.5 | 6.3 |
| | (A-7) | (B-2) | | | |
| F-34 | 1 | 2.5 | Tap | 43 | 6.7 |
| F-35 | 0.2 | 1.2 | Tap | 53 | 6.8 |

All of the fountain solutions were tested on a Harris offset press and produced successful printing performance. The fountain solutions identified as F-5 and F-11 yielded comparatively better ink distribution on the inking rollers and higher printed gloss on the solid print. In general, the higher concentrations of Solution A produced better blanket release and a smoother and faster ink distribution on the rollers. Meanwhile, higher concentrations of Solution B seemed to keep the printing plate cleaner. In addition, the fountain solution formulations containing Solutions A-3 and A-7 were found to be most desirable for sheet fed presses using the Dahlgren dampening system. Although all of the fountain solution formulations provided acceptable prints with PC-60, the optimum conditions of surface tension and pH for proper maintenance of the hydrophobic/hydrophilic properties of the image/non-image areas of the plate were found to be between about 50–63 dynes/cm. and at a pH of from about 5.6–8.

A fountain solution formulation utilizing the etch concentrates A-2 and B-2 was prepared with tap water at concentrations of about 1 and 2% respectively. The formulation had a surface tension of about 47–51 dynes/cm. and a pH of about 7. The formulation was then run on a 6 unit, web fed offset press with a Dahlgren dampening system and the performance was characterized as exceptionally good.

Another printing trial was conducted on a sheet fed two unit press with a Dahlgren dampening system using a fountain solution formulation consisting of 1% of Solution A-1 and 1.5% of Solution B-2. Local tap water was used for dilution and the fountain solution so produced had a surface tension of about 46–52 dynes/cm and a pH of about 6.6–7.1. The prints produced compared favorably with similar prints made using a fountain solution formulation containing alcohol.

EXAMPLE II

Two sulfonated tall oil fatty acid materials were used to prepare several additional fountain solution formulations using products produced by the Westvaco Corporation Chemical Division. The materials, designated CCS-501-Acid and CCS-502-Acid are derivatives of Oleic Acid and are produced by reacting sulfuric acid with tall oil fractions containing mainly oleic acid. The mineral acid (sulfuric acid) reacts with the double bond of Oleic acid to produce the sulfonated tall oil fatty acid materials used in these experiments. Both CCS-501 and CCS-502 are sulfonated at least to about the 50% level and preferably to about the 80% level. The two materials were used separately to prepare the etch concentrate Solution A as follows.

| Solution | Solution A: Sulfonated Tall Oil gr. | Solution A: Potassium Hydroxide (KOH) gr. | Water Distilled | Total Volume cc. |
|---|---|---|---|---|
| A-10 | 2 | 0.5 | As req'd | 100 |
| A-11 | 2 | 1.0 | " | 100 |
| A-20 | 2 | 0.5 | " | 100 |
| A-21 | 2 | 1.0 | " | 100 |

Solutions A-10 and A-11 contained the sulfonated tall oil fatty acid material designated CCS-501 Acid and Solutions A-20 and A-21 contained CCS-502 Acid. Several fountain solution formulations were prepared by diluting the etch concentrates as shown in Table II.

TABLE II

| Fountain Solution | Solution A % Vol. | Solution B % Vol. | Dilution Water | F.S. Properties γ (dynes/cm) | F.S. Properties pH |
|---|---|---|---|---|---|
| | (A-10) | (B-2) | | | |
| 1-501 | 1 | 1.5 | Tap | 46 | 6 |
| | (A-11) | (B-2) | | | |
| 2-501 | 0.5 | 1.25 | Tap | 54 | 6.7 |
| | (A-10) | (B-1) | | | |
| 3-501 | 1 | 1 | Tap | 44 | 6 |
| 4-501 | 0.5 | 0.5 | Tap | 50 | 6 |
| 5-501 | 1 | 0.5 | Tap | 49 | 5.9 |
| 6-501 | 0.5 | 1 | Tap | 57 | 5.8 |

All of the combinations noted in Table II showed satisfactory performance on the Harris offset press with a conventional plate dampening system. In particular, the Fountain Solution identified as 1—501 and 2—501 yielded the best print dot integrity and ink density.

Solutions A-20 and A-21 were used to prepare several more fountain solution formulations. Each contained the sulfonated tall oil fatty acid material designated CCS-502-Acid in the proportions shown in Table II (*a*).

TABLE II (a)

| Fountain Solution | Solution A % Vol. | Solution B % Vol. | Dilution Water | F.S. Properties γ (dynes/cm) | F.S. Properties pH |
|---|---|---|---|---|---|
| | (A-20) | (B-2) | | | |
| 1-502 | 0.5 | 1.6 | Tap | 44.5 | 5.8 |
| | (A-20) | (B-1) | | | |
| 2-502 | 1 | 1 | Tap | 41 | 6.0 |
| 3-502 | 0.5 | 0.5 | Tap | 48 | 5.9 |
| 4-502 | 0.2 | 0.5 | Tap | 50 | 5.8 |
| 5-502 | 1.0 | 2.0 | Tap | 42 | 6.0 |
| 6-502 | 1.0 | 4.0 | Tap | 40 | 6.0 |
| 7-502 | 2.0 | 1.0 | Tap | 43 | 6.2 |
| 8-502 | 2.0 | 0.5 | Tap | 43 | 6.2 |
| 9-502 | 0.5 | 0.2 | Tap | 49 | 5.8 |
| | (A-21) | (B-2) | | | |
| 10-502 | 0.5 | 1.5 | Tap | 45 | 6.3 |
| 11-502 | 0.5 | 1.25 | Tap | 49 | 6.2 |

For the fountain solution formulations shown in Table II (*a*), the printing trials were also conducted on a Harris offset press with a conventional dampening system. Generally, the lower concentrations of Solution A-20 and A-21 in combination with Solution B which yielded surface tension readings of about 44–49 dynes/cm produced the best results.

EXAMPLE III

The third group of fatty acid materials that were found useful in the present invention were modified esters of glycerol and fatty acids such as mono and dicarboxylic modified triglycerides. Two modified triglycerides including acrylic acid modified triglyceride and fumaric acid modified triglyceride were used to prepare samples of Solution A as shown in the accompanying chart. The fatty acid materials are products of the Westvaco Corporation Chemicals Division.

| Solution | Solution A: Modified Triglycerides cc. | Solution A: Potassium Hydroxide (KOH) gr. | Water Distilled | Total Volume cc. |
|---|---|---|---|---|
| A-50 | 1.5 | 0.25 | As req'd | 100 |
| A-51 | 2 | 0.5 | " | 100 |
| A-52 | 1 | 0.25 | " | 100 |
| A-40 | 1 | 0.25 | " | 100 |

-continued

| | Solution A | | | |
|---|---|---|---|---|
| Solution | Modified Triglycerides cc. | Potassium Hydroxide (KOH) gr. | Water Distilled | Total Volume cc. |
| A-41 | 2 | 1.0 | " | 100 |

Solutions A-50 through A-52 contained an acrylic acid modified triglyceride having an acid number of about 55 and Solutions A-40 and A-41 contained a fumaric acid modified triglyceride having an acid number of about 112. Several fountain solution formulations were prepared with the etch concentrates shown in the chart above and were tested as in Examples I and II. The results of the tests are shown in Table III.

TABLE III

| Fountain Solution | Solution A % Vol. | Solution B % Vol. | Dilution Water | F.S. Properties γ (dynes/cm) | F.S. Properties pH |
|---|---|---|---|---|---|
| | (A-50) | (B-2) | | | |
| 1-531 | 1 | 4 | Tap | 52 | 6.2 |
| 2-531 | 1.5 | 1.5 | Tap | 41.5 | 6.2 |
| | (A-51) | (B-2) | | | |
| 3-531 | 0.5 | 1.25 | Tap | 53 | 6.4 |
| | (A-40) | (B-2) | | | |
| 4-532 | 0.4 | 1 | Tap | 63 | 5.7 |
| 5-532 | 0.4 | 2 | Tap | 50 | 5.7 |
| | (A-41) | (B-2) | | | |
| 6-532 | 0.5 | 1.25 | Tap | 42 | 6.5 |

The fountain solutions identified as 531 in Table III contained the acrylic acid modified triglyceride while those identified with the designation 532 contained the fumaric acid modified triglyceride. Print tests were performed with the fountain solutions noted in Table III on the Harris offset press using a conventional plate dampening system and the results were deemed very successful.

The fountain solution etch concentrates used in the Examples set forth hereinbefore were all prepared in substantially the same manner. All Solutions identified with the prefix A were prepared by first dissolving a monovalent hydroxide in a volume of water equal to or slightly more than one half of the desired volume. The selected fatty acid material was then added with mixing before adding the final volume of water. In each case, distilled water was used to prepare the etch concentrates but tap water could be used with the same results. Similarly, the etch concentrate, Solution B was prepared by first dissolving gum arabic in distilled water and then adding the monovalent iodide. For preparing the final fountain solution formulations, regardless of the composition of Solutions A and B, the same procedure was followed in each case. Solution A was first added to a volume of water nearly equal to the final volume desired, and after mixing, the selected volume of Solution B was added with water up to the final total volume. Before adding the fountain solutions to the press dampening systems, the solutions were well mixed.

Thus having disclosed hereinbefore the preferred formulation and several different embodiments of the present invention, it is to be understood that various changes and modifications may be made by those skilled in the art without departing from the spirit of the invention as defined in the appended claims.

I claim:

1. A method of treating an offset printing plate for printing comprising applying to an offset printing plate a fountain solution comprising water, a desensitizing gum, a monovalent hydroxide selected from the group consisting of potassium, sodium, lithium and ammonium hydroxides, a monovalent iodide selected from the group consisting of sodium, potassium and lithium iodides, and a fatty acid material having at least about 6 carbon atoms in the linear chain.

2. The method of claim 1 wherein the desensitizing gum is gum arabic.

3. The method of claim 2 wherein the fatty acid material is derived from the group consisting of vegetable oils and animal fatty oils, and fats.

4. The method of claim 3 wherein the vegetable oils include tall oil, soya bean oil and linseed oil.

5. The method of claim 4 wherein the fatty acid material comprises a fatty acid fraction.

6. The method of claim 5 wherein the fatty acid fraction is selected from the group consisting of stearic; oleic and linoleic acids.

7. The method of claim 6 wherein the fatty acid fraction is sulfonated.

8. The method of claim 6 wherein the fatty acid fraction is sulfated.

9. The method of claim 5 wherein the fatty acid fraction comprises a modified triglyceride.

10. The method of claim 9 wherein the modified triglyceride is selected from the group consisting of acrylic acid and fumaric acid modified triglycerides.

11. A composition of matter which is to be diluted with water for use in the fountain of an offset printing press comprising:

a. a first etch concentrate comprising water, a monovalent hydroxide selected from the group consisting of potassium, sodium, lithium and ammonium hydroxides and a fatty acid material having at least about 6 carbon atoms in the linear chain; and, b. a second etch concentrate comprising water; a desensitizing gum and a monovalent iodide selected from the group consisting of sodium, potassium and lithium iodides.

12. The composition of matter recited in claim 11 wherein the desensitizing gum is gum arabic.

13. The composition of matter recited in claim 12 wherein the fatty acid material is derived from the group consisting of vegetable oils and animal fatty oils, and fats.

14. The composition of matter recited in claim 13 wherein the vegetable oils include tall oil, soya bean oil and linseed oil.

15. The composition of matter recited in claim 14 wherein the fatty acid material comprises a fatty acid fraction.

16. The composition of matter recited in claim 15 wherein the fatty acid fraction is selected from the group consisting of stearic, oleic and linoleic acid.

17. The composition of matter recited in claim 16 wherein the fatty acid material is a sulfonated fatty acid.

18. The composition of matter recited in claim 17 wherein the fatty acid material is sulfonated oleic acid.

19. The composition of matter recited in claim 18 wherein the fatty acid material is sulfonated to at least about the 50% level.

20. The composition of matter recited in claim 19 wherein the first etch concentrate contains at least about 2% of the sulfonated oleic acid fatty acid material and at least about 0.5% of said monovalent hydroxide and the second etch concentrate contains at least about 1% of said monovalent iodide and at least about 5% of said desensitizing gum.

21. The composition of matter recited in claim 20 wherein said composition of matter includes at least about 0.2% of the first etch concentrate and at least about 0.2% of the second etch concentrate and has a substantially neutral pH and a surface tension ranging from about 40 to 57 dynes/cm.

22. The composition of matter recited in claim 21 wherein said composition of matter includes about 0.2–1.0% of the first etch concentrate and about 0.2–1.0% of the second etch concentrate and has a substantially neutral pH and a surface tension ranging from about 44–49 dynes/cm.

23. The composition of matter recited in claim 16 wherein the fatty acid material is a sulfated fatty acid.

24. The composition of matter recited in claim 23 wherein the fatty acid material is sulfated to at least about the 50% level.

25. The composition of matter recited in claim 24 wherein the first etch concentrate contains at least about 1% of the sulfated fatty acid fraction and at least about 0.25% of said monovalent hydroxide and the second etch concentrate contains at least about 1% of said monovalent iodide and at least about 5% of said desensitizing gum.

26. The composition of matter recited in claim 25 wherein said composition of matter includes at least about 0.1% of the first etch concentrate and at least about 0.05% of the second etch concentrate.

27. The composition of matter recited in claim 26 wherein said composition of matter has a pH ranging from about 5.6 to 11 and a surface tension ranging from about 43 to 65 dynes/cm.

28. The composition of matter recited in claim 26 wherein said composition of matter has a pH ranging from about 5.6–8 and a surface tension ranging from about 50–63 dynes/cm.

29. The composition of matter recited in claim 25 wherein said composition of matter includes about 1% of the first etch concentrate and about 2% of the second etch concentrate, with a pH of about 7 and a surface tension ranging from about 47–51 dynes/cm.

30. The composition of matter recited in claim 25 wherein said composition of matter includes about 1% of the first etch concentrate and about 1.5% of the second etch concentrate, with a pH of from about 6.7 to 7.1 and a surface tension ranging from about 46–52 dynes/cm.

31. The composition of matter recited in claim 15 wherein the fatty acid fraction comprises a modified triglyceride.

32. The composition of matter recited in claim 31 wherein the modified triglyceride is selected from the group consisting of acrylic acid and fumaric acid modified triglycerides.

33. The composition of matter recited in claim 32 wherein the first etch concentrate contains at least about 1% of an acrylic acid modified triglyceride and at least about 0.25% of said monovalent hydroxide and the second etch concentrate contains at least about 1% of said monovalent iodide and at least about 5% of said desensitizing gum.

34. The composition of matter recited in claim 33 wherein said composition of matter includes at least about 0.5% of the first etch concentrate and at least about 1.25% of the second etch concentrate and has a substantially neutral pH and a surface tension ranging from about 41.5 to 53 dynes/cm.

35. The composition of matter recited in claim 32 wherein the first etch concentrate contains at least about 1% of a fumaric acid modified triglyceride and at least about 0.25% of said monovalent hydroxide and the second etch concentrate contains at least about 1% of said monovalent iodide and at least about 5% of said desensitizing gum.

36. The composition of matter recited in claim 35 wherein said composition of matter includes at least about 0.4% of the first etch concentrate and at least about 1% of the second etch concentrate and has a substatially neutral pH and a surface tension ranging from about 42 to 63 dynes/cm.

* * * * *